United States Patent [19]

Osawa

[11] Patent Number: 4,663,674
[45] Date of Patent: May 5, 1987

[54] VIDEO CASSETTE DESIGNED FOR VIDEO THEATER USE

[75] Inventor: Akihisa Osawa, Yokohama, Japan

[73] Assignee: Sony Corporation, Tokyo, Japan

[21] Appl. No.: 821,127

[22] Filed: Jan. 22, 1986

Related U.S. Application Data

[62] Division of Ser. No. 548,765, Nov. 4, 1983, abandoned.

[30] Foreign Application Priority Data

Nov. 11, 1982 [JP] Japan ............................ 57-170797[U]
Nov. 12, 1982 [JP] Japan ................................. 57-198778

[51] Int. Cl.⁴ ............................................. H04N 5/782
[52] U.S. Cl. .................................. 360/14.1; 360/33.1; 360/137
[58] Field of Search .................... 360/15, 33.1, 37.1, 360/60, 14.1, 14.2, 14.3; 358/114, 118, 120, 122, 123, 147, 145, 146, 310, 320, 335, 319

[56] References Cited

U.S. PATENT DOCUMENTS

| | | | |
|---|---|---|---|
| 3,004,104 | 10/1961 | Hembrooke | 360/60 |
| 3,493,674 | 2/1970 | Houghton | 358/147 |
| 3,749,831 | 5/1972 | Simpkins | 358/147 |
| 3,755,641 | 8/1973 | Rackman | 360/60 |
| 3,839,736 | 10/1974 | Hoshall | 360/60 |
| 3,963,865 | 6/1976 | Songer | 360/37.1 |
| 4,086,634 | 4/1978 | Cook | 360/60 |
| 4,100,575 | 7/1978 | Morio et al. | 360/37.1 |
| 4,112,445 | 9/1978 | Steinkopf et al. | 360/37.1 |
| 4,134,130 | 1/1979 | Tachi | 360/37.1 |
| 4,156,253 | 5/1979 | Steudel | 358/145 |
| 4,159,480 | 6/1979 | Tachi | 358/147 |
| 4,360,843 | 11/1982 | Menezes et al. | 360/14.3 |
| 4,475,129 | 10/1984 | Kagota | 358/310 |
| 4,516,164 | 5/1985 | Moxon | 360/14.1 |
| 4,528,588 | 7/1985 | Löfberg | 360/15 |

OTHER PUBLICATIONS

McFadin, "Accurate Film Edit Decision Making Using Videotape as the Medium", SMPTI Journal vol. 90, No. 11 (Nov. 1981), pp. 1085-1089.

*Primary Examiner*—Donald McElheny, Jr.

[57] ABSTRACT

A video theater system employs a rental video cassette which has extra ribs on the periphery thereof for inhibiting an unfair use in conjunction with a conventional cassette VTR, and in which an ID code is also superimposed on video signals on tape within the cassette so that it is possible to determine a particular video theater from which a video program is leaked by detecting the ID code from a copied cassette.

1 Claim, 7 Drawing Figures

VIDEO CASSETTE DESIGNED FOR VIDEO THEATER USE

This is a division of application Ser. No. 548,765 filed Nov. 4, 1983, now abandoned.

BACKGROUND OF THE INVENTION

The present invention generally relates to a video theater system which employs a video projector and a video tape recorder and particularly to a video cassette adapted for use with video theater equipment which can inhibit the personal use or dubbing of a video program stored in the cassette.

Recently, movie theaters have become popular with audiences of about 100 people, and at which a video projector and a video tape recorder (VTR) are employed. Such a video theater is a movie theater which uses a video projector to show a movie. And, as compared with a conventional movie theater using film, the video theater has the advantage that a sophisticated plan for the theater best suited for the audience is possible and the cost of operation and management can be decreased considerably. The video signal source for the video projector used in this video theater is a cassette VTR for ordinary use, and this VTR employs a cassette video tape on which a desired program was recorded.

In general, the recorded content on the video tape can be copied quite easily, unlike a movie film so that there is then a risk that the video program is unfairly copied. And, there is a disadvantage that the producer of the program (including those who own the copyright), when they rent out the video tape on which a desired program was recorded, do so with fear that the program may be copied. Furthermore, when the dubbing and copying of the video tape are made, it is impossible to determine the location at which the dubbing and copying were made.

SUMMARY OF THE INVENTION

Accordingly, it is an object of the present invention to provide an improved video theater system employing a video projector and a cassette VTR.

It is another object of the present invention to provide a video theater system employing a VTR system which fundamentally includes a cassette VTR.

It is further an object of the present invention to provide a video theater system which can prevent a video cassette designed for video theater use from being played back for personal use and being recklessly dubbed.

According to one aspect of the present invention, the shape of the video cassette for a video theater use is different from that of a conventional video cassette. Namely, the video cassette for video theater use can not be installed into a conventional VTR. In this case, of course, a special VTR is rented for each video theater.

Furthermore, to inhibit the dubbing, a particular code is superimposed on video signals which are recorded on a video cassette for rental use. For example, this code is an ID code specified for each video theater. Thus, when the rental video cassette is dubbed, the ID code is dubbed, too. As a result, if the ID code superimposed on the copied video cassette is detected by an ID checker, it is possible to determine a theater in which the dubbing is carried out. Therefore, if the superimposition of the ID code is understood in advance by each video theater, it is possible to inhibit in advance the unfair dubbing. Of course, in this case, it is necessary for the ID code to be recorded on the video signals at a position which can not be erased by the ordinary VTR without difficulty.

DESCRIPTION OF THE PREFERRED EMBODIMENTS

The present invention will hereinafter be described in detail with reference to the attached drawings.

Figure 1:
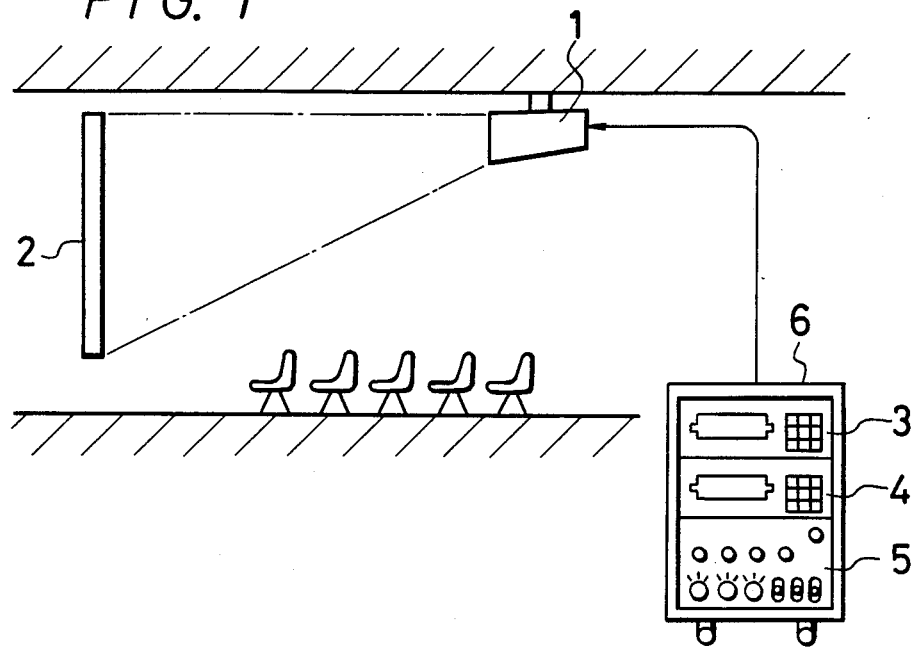
FIG. 1 is a schematic diagram showing an example of a video theater system according to the present invention.

As shown in FIG. 1, an example is provided of the video theater system according to the present invention and which has a video projector 1 hung down from a ceiling of a room, and a projector-screen 2 provided in facing relation to the projector 1. Furthermore, a pair of cassette VTRs 3 and 4 are prepared to supply video signals to the video projector 1. The operation of these VTRs 3 and 4 is controlled by a controller 5.

Figure 2A:
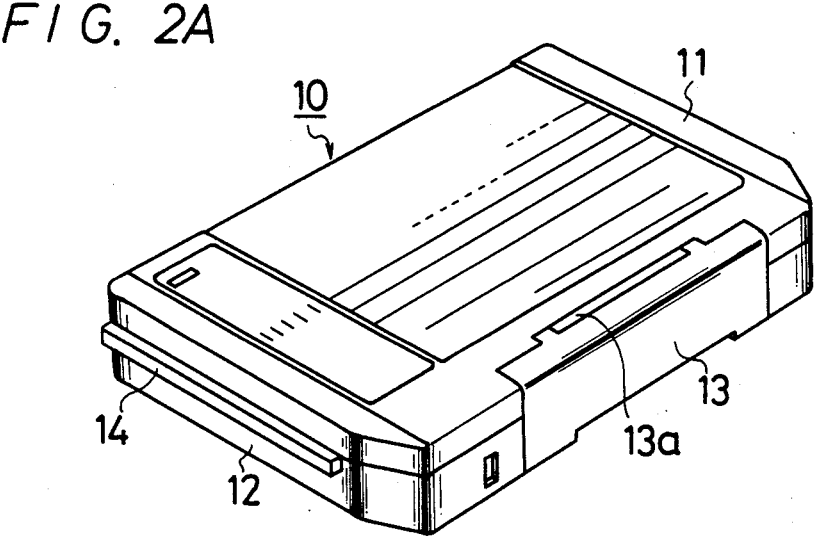
FIG. 2A is a perspective view showing an embodiment of a video cassette according to the invention which is designed for video theater use.
Figure 2B:
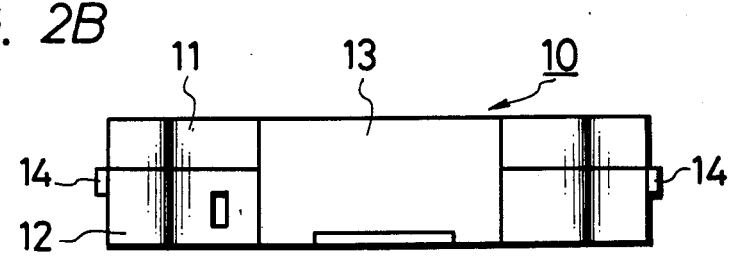
FIG. 2B is a front view of the cassette shown in FIG. 2A.
Figure 3:
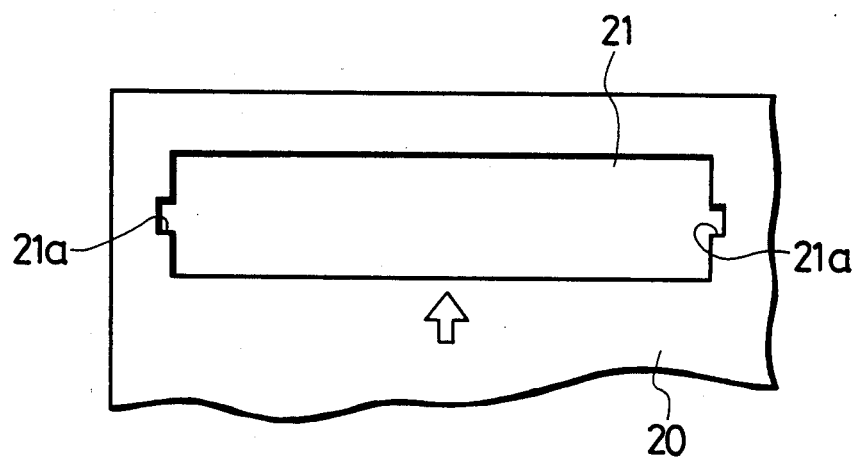
FIG. 3 is a front view of an embodiment of a VTR used in the video theater system of the present invention.

In general, in a U-matic (trade mark) conventional cassette VTR employing a video tape of, for example, ¾ inch, a maximum playing time thereof is one hour, for example. Therefore, when a video program having a playing time longer than one hour is projected, the playing of the program can not be carried out continuously by one cassette VTR. For this reason, as shown in FIG. 1, two cassette VTRs 3 and 4 are prepared and thus a playing time longer than one hour can be realized by sequential play of two cassette VTRs 3 and 4. Of course, a playing time of more than two hours can be achieved by sequential play of two cassette VTRs 3 and 4. If necessary, more than two VTRs may be provided. Considering the video theater system, each theater rents a VTR console 6 in which the VTRs 3, 4 and the controller 5 are incorporated together. Of course, a program maker also rents a video program to each video theater in the form of a video cassette. In this case, various techniques are provided to inhibit unfair personal use of the video cassette for other than video theater use. One of such techniques is that the shape of the video cassette for video theater use is made different from that of the conventional video cassette. An example of a video cassette for video theater use according to the invention is shown in FIGS. 2A and 2B. In the figures, reference numeral 10 generally designates an example of the video cassette according to the invention which consists of an upper half 11, a lower half 12, and a lid 13. The upper half 11 and the lower half 12 are each formed by plastic molding, and the lid 13 is made of metal which is hinged at 13a to the upper half 11. The configuration of this video cassette described above is the same as that of the conventional U-matic video cassette having incorporated therein a supply-reel and a take-up reel around which a video tape is wound. The feature of the video cassette for video theater use lies in a rib 14 provided on both side walls of the video cassette 10 along its insertion direction. Accordingly, the VTR for theater use can not be installed in a conventional recorder because of the ribs 14. However, each of the VTRs 3 and 4 for video theater use according to the invention has a cassette entrance of a configuration as shown in FIG. 3. Namely, a cassette opening 21 bored through a front panel 20 of each of the VTRs 3 and 4 is formed with cut outs 21a corresponding to the ribs 14 formed on both side walls of the cassette 10. Thus, the video cassette 10 for video theater use can be played by only the VTR for video theater use, but the video cassette 10 is prevented from being played by the ordinary VTR and the dubbing thereof is also inhibited.

Furthermore, in the present invention, in order to avoid any unfair dubbing of the video cassette tape delivered to the video theater, an ID signal is recorded thereon together with a video program. More particularly, at the time when the video program is recorded on the video tape of the video cassette for rental use from a master VTR, an ID code assigned to each video theater is recorded on the video tape and is mixed into the program.

Figure 4A:
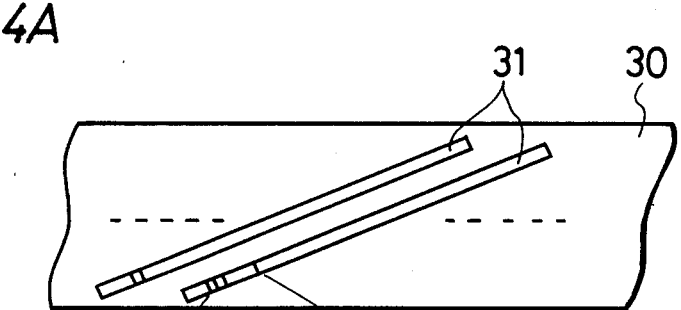
FIG. 4A is a diagram showing a track pattern on the video tape used in the present invention.
Figure 4B:
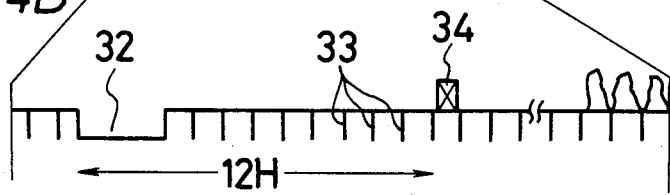
FIG. 4B is an enlarged view of the video track on the video tape used to explain an ID code signal recorded on the video track shown in FIG. 4A.

As shown in FIG. 4A, a plurality of video tracks 31 are formed in slantwise fashion on a video tape 30 in the video cassette 10. An ID code 34 according to the present invention is inserted into, for example, the 12th horizontal blanking interval counted from a V-sync signal (vertical synchronizing signal) 32 of a video signal as shown in FIG. 4B. This ID code 34 inserted into the 12th horizontal blanking interval is recorded in the form of digital data and an ordinary user can not separately erase this ID code 34 without difficulty. In FIG. 4B, a reference numeral 33 designates horizontal sync signals.

Figure 5:
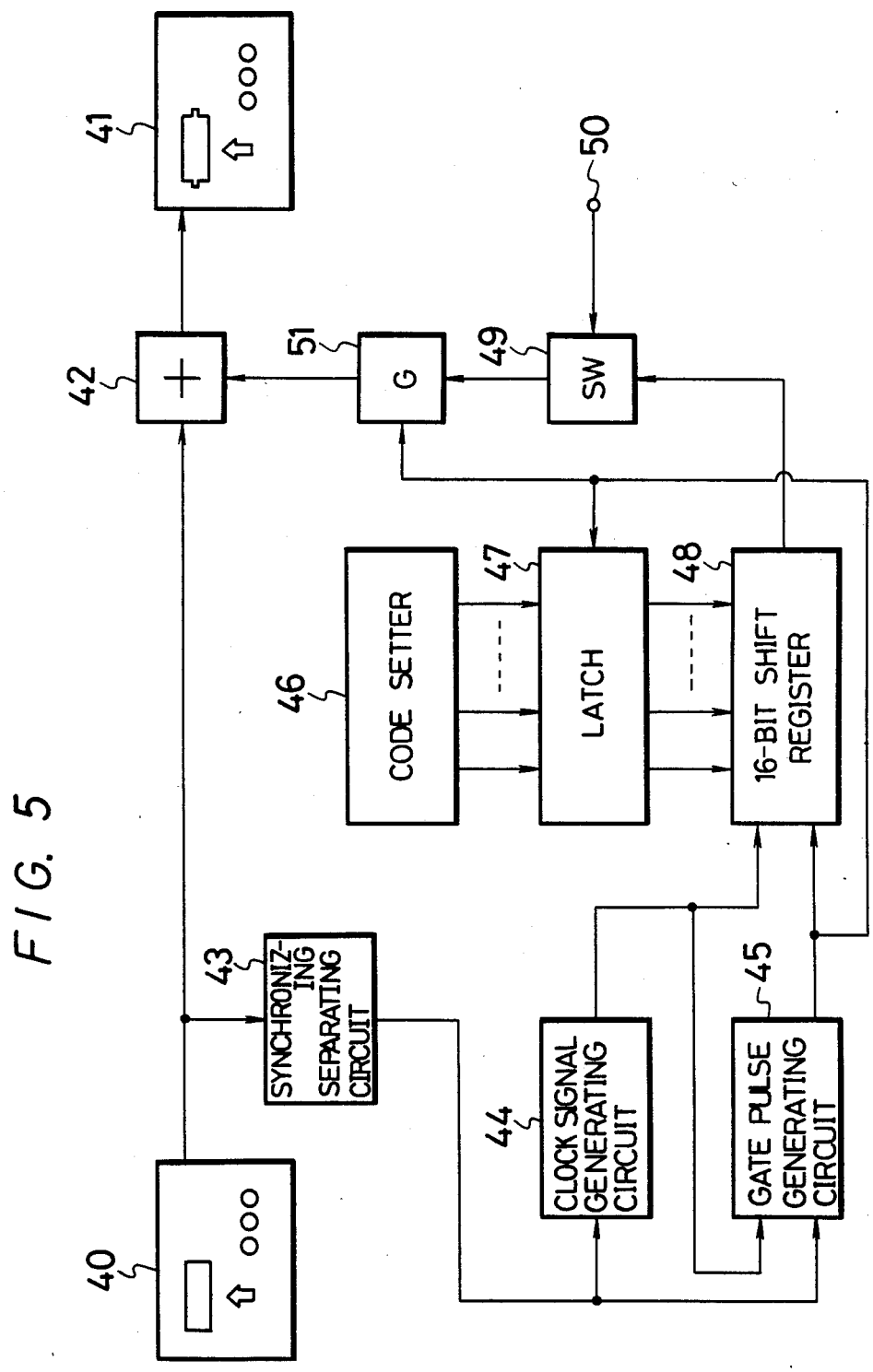
FIG. 5 is a block diagram of an ID code mixing circuit used in the present invention.

When the video cassette tape for video theater use superimposed with this ID code 34 at horizontal blanking intervals of the video signals is prepared, an ID code mixing circuit shown in FIG. 5 is employed. In FIG. 5, reference numeral 40 designates a master VTR for reproducing a master video tape on which a desired program was recorded and 41 a slave VTR for copying a video tape which will be delivered to each video theater. The reproduced video signal from this master VTR 40 is supplied through a mixing circuit 42 to the recording signal input terminal of the slave VTR 41. The video signal reproduced from the master VTR 40 is also supplied to a synchronizing separating circuit 43 and the synchronizing signal appearing at the output side of the synchronizing separating circuit 43 is supplied to a clock signal generating circuit 44. Thus, the clock signal generating circuit 44 is synchronized with the synchronizing signal. The vertical synchronizing signal obtained at the output side of the synchronizing separating circuit 43 is further supplied to a gate pulse generating circuit 45. Reference numeral 46 designates a code setter which sets a particular ID code to be assigned to each video theater to which the video tape is delivered. The ID code signal set by this code setter 46 on the basis of a BCD (binary coded decimal) coding method is supplied to a latch 47. The latch 47 is operated at the leading edge of the gate signal applied thereto from the gate pulse generating circuit 45. The output signal from the latch 47 is supplied to a 16-bit shift register 48 in which the parallel output signals from the latch 47 are converted into serial data. The ID code signal according to the BCD coding method obtained at the output side of the shift register 48 is fed to the mixing circuit 42 through a switching circuit 49 which is turned on and off in response to the control signal supplied to a control signal input terminal 50 from the outside and a gate circuit 51 which allows the signal to pass therethrough during a particular horizontal blanking interval. In this case, when the ID code signal for a particular theater is recorded on the whole area of the video tape, a control signal which allows the switching circuit 49 to be always on is supplied to the control signal input terminal 50. Also, the control signal may turn on this switching circuit 49 at each predetermined time for a predetermined duration of time, or a control signal may be provided at terminal 50 which turns on the switching circuit 49 at the main portion of the recorded contents on the master video tape.

When a video tape according to this invention is to be delivered to the video theater, the tape is obtained by copying a program from a master video tape to be supplied to the video projector, and the copy is modified in the following manner. At first the ID code assigned to each video theater to which the video cassette is to be delivered is set by the code setter 46. The ID code signal set by the code setter 46 is supplied through the latch 47 to the shift register 48. At that time, the master VTR 40 is switched to the reproducing mode. As a result, the video signal reproduced from this master VTR 40 is supplied to one input terminal of the mixing circuit 42 and the gate signal from the gate pulse generating circuit 45 is supplied to the gate circuit 51 so that during the period of this gate signal, the ID code signal is supplied to the other input terminal of the mixing circuit 42. Thus, at the output side of this mixing circuit 42 appears a video signal in which the ID code signal is superimposed on the 12th horizontal blanking interval counted from the V-sync signal 32. This video signal is recorded by the slave VTR 41 on its video tape. Therefore, the video tape to be delivered to the video theater is recorded with the ID code signal for the specific video theater superimposed upon the vertical blanking interval of the video signal.

The video tape thus made is delivered to the video theater to which the ID code corresponds with the predetermined ID code recorded on the video tape. In the video theater, by employing the delivered video tape, a desired video program can be projected by the video projector. In this case, since the ID code signal is recorded in the vertical blanking interval of the video signal, no undesirable influence is present in the picture on the screen.

When unfair copying of the delivered video tape occurs, the head office for delivering the video tape for video theater prepares an ID code reader to detect the ID code signal recorded in the vertical blanking interval of the video signal of the copied video tape. It is thus possible to figure out a particular video theater which performed the unfair copying of the video tape by detecting the ID code recorded on the copied video tape.

While in the above embodiment the ID code signal is inserted into the vertical blanking interval of the video signal and then recorded, the ID code signal can also be inserted into the horizontal blanking interval of the video signal.

As set forth above, according to the present invention, since the ID code signal for each video theater is inserted into the blanking interval of the video signal and then recorded, it is possible to figure out a particular video theater in which the video tape is unfairly copied by detecting ID code signals from the copied video tape.

Although various minor changes and modifications might be proposed by those skilled in the art, it will be understood that I wish to include within the claims of the patent warranted hereon all such changes and modifications as reasonably come within my contribution to the art.

I claim as my invention:

1. A dubbing system for making rental video cassettes, comprising:
   - a source video player means for reproducing video signals of a program to be recorded on a video tape of a rental video cassette;
   - sync separating means for separating sync signals out of said reproduced video signals;
   - clock signal generating means and gate pulse generating means connected to receive separated sync signals from the sync separating means, said gate pulse generating means also being connected to receive clock signals from said clock signal generating means;
   - shift register means connected to receive clock signals from the clock signal generating means and an output signal from the gate pulse generating means;
   - code setter means for generating arbitrary ID code signals assignable to specific renters of the rental video cassette, outputs of said code setter means connecting through a latch means to said shift register means;
   - gate circuit means connected to receive an output from the shift register means through a switch means and also connected to receive an output of the gate pulse generating means, said gate circuit means thus being supplied with ID code signals and gate pulse generating means signals for synchronizing said ID code signals to desired horizontal scan intervals within a vertical blanking interval of said video signals;
   - said switch means permitting selective connection of the ID code signals to the gate circuit means depending upon when it is desired to place the ID code signals in the desired horizontal scan intervals;
   - mixing means connected to an output of the gate circuit means and also to the source video player means for mixing said reproduced video signals and said synchronized ID code signals so as to create mixed video signals; and
   - video cassette recorder means for recording the mixed video signals obtained from said mixing means onto the video tape of the rental video cassette.

* * * * *